UNITED STATES PATENT OFFICE.

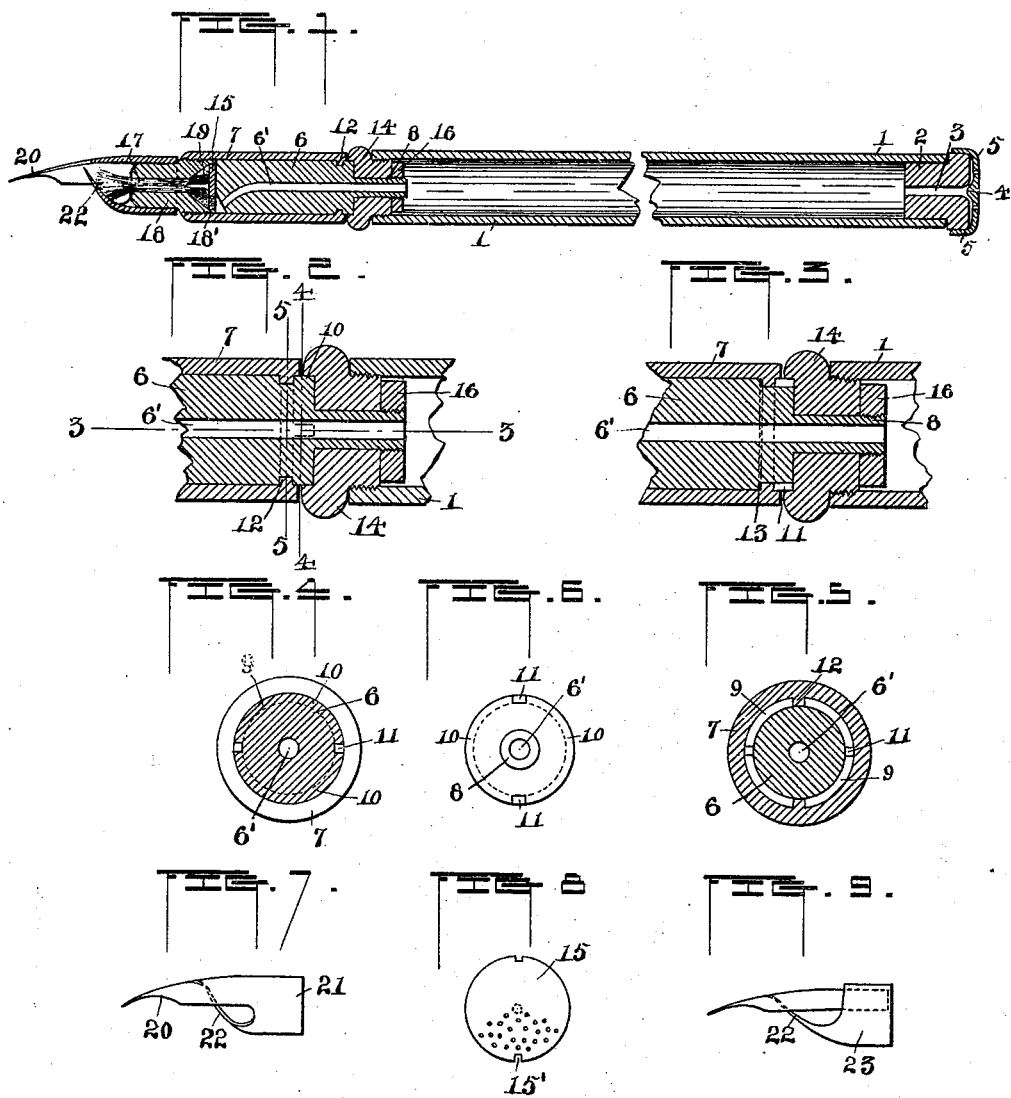

ALBA H. ROBINSON, OF MEEKER, COLORADO.

FOUNTAIN-PEN.

SPECIFICATION forming part of Letters Patent No. 478,944, dated July 12, 1892.

Application filed January 27, 1892. Serial No. 419,435. (No model.)

*To all whom it may concern:*

Be it known that I, ALBA H. ROBINSON, a resident of Meeker, in the county of Rio Blanco and State of Colorado, have invented certain new and useful Improvements in Fountain-Pens; and I do hereby declare the following to be a full, clear, and exact description of the invention, such as will enable others skilled in the art to which it pertains to make and use the same.

The invention relates to a fountain-pen, and has for its object to provide devices for applying ink to the pen proper and for regulating the amount so supplied, which devices shall also be adapted to entirely cut off the flow of ink when desired.

It also has for its object to provide for easily changing pens, and also to furnish a construction which when the pen proper is removed can be used as a brush; and the invention consists in the construction hereinafter described and particularly pointed out.

In the drawings, Figure 1 is a longitudinal section. Fig. 2 is a similar view, on an enlarged scale, of a part of the penholder, a slot being indicated by dotted lines. Fig. 3 is a similar section on line 3 3 of Fig. 2, but showing an elastic packing. Figs. 4 and 5 are sections on line 4 4 and 5 5, respectively, of Fig. 2. Fig. 6 is an end view of a plug. Figs. 7 and 9 are side elevations, and Fig. 8 a plan of details.

Numeral 1 denotes a tubular well or ink-holder, and 2 a removable plug closing the upper end thereof and provided with an air-inlet 3. This inlet may have a closing-nipple 4 on a spring 5, secured to the plug as by a circular part 5', and so as normally to hold said nipple slightly above the aperture 3, but in such manner that a slight external pressure will force it into the aperture and close the same, as when the spring is pushed into the plug or the pen is placed on end and its weight made to bend the spring toward said aperture.

6 is a small tube connected, as hereinafter described, to tube 1. The lower opening of the bore of this tube is eccentrically arranged and communicates with a small recess formed at the foot of said tube by beveling it, as shown. The whole length of this bore may be eccentric, if desired.

7 is a tube surrounding tube 6 and provided with a plug adapted to receive a brush and pen. Tubes 6 and 7 have bayonet-joint or equivalent connection, which will next be described. In the tube is a slot or recess 9. Upon tube 6 are two flanges 10, which are nearly equal to semicircles and are separated by small spaces 11, which communicate with slot 9, as indicated in Fig. 5 and by dotted lines in Fig. 2.

On the inner side of the tube 7 are fixed projections or fingers 12. These are sufficiently narrow in transverse dimension to pass through the spaces 11, whereupon the exterior tube can be turned to move said projections under the flanges 10.

13 is an elastic cushion or packing, which may be used if desired.

14 is a plug fitted upon an extension 8 of the tube 6 and having a screw-threaded connection with tube 1.

8' is a nut engaging the screw-threaded end of the extension 8 and adapted to fasten the plug upon tube 6.

18 is a plug having screw-threaded connection with tube 7 and cored out, as shown. It may be provided with lugs 18' to engage the slots 15' in the disk 15. The construction is such that by screwing up the plug the disk 15 may be forced against the end of tube 6, said disk being rotatable with the plug and with tube 7, while tube 6 is held by the described connection with plug 14 and tube 1.

The invention is not limited to the particular means of connecting the tubes 6 and 7, as other equivalent devices may be selected. Situated in the interior of the tube 7 and rotatable with it is the disk 15, provided at one side with several small perforations and also with a short stem 16. These perforations are fine capillary passages, or if made large these should be filled with some fibrous material having such passages. The stem 16 is made to receive about itself the brush 17, held in the short tube or plug 18, fitted within the tube 7, as stated.

19 indicates sponge or other fiber surrounding the brush.

Ink is fed through the bent or eccentric passage 6' of tube 6 into a small recess formed at the foot of the tube by beveling it or otherwise. The perforated disk 15 is normally arranged, so that its perforations shall communicate with and receive ink from said recess.

The pen 20 is made with a tubular part 21, adapted to fit on the tube 18.

22 indicates needle or guide for ink. Instead of providing the pen 20 with a cylindrical part to fit the tube or plug 18, a short tube 23, provided with ink-guides 22, can be applied to tube 18, and so that ordinary pens may be slipped between said tubes and suitably held thereby for use.

The plug 2 being removed, ink can be supplied to the well in any desired quantity. When the plug is restored, the longitudinal perforation in it admits air to supply the place of ink in writing. If the closing-nipple is used, it can be made to close this air-inlet whenever the pen is not in use by pushing the tubular spring-clasp 5' farther onto tube 1. The spring 5 can be adapted to be bent by the weight of the pen, so as to close the air-inlet when the pen is supported on its upper end. The use of this closing-nipple is, however, not necessary to the other advantages of my improvement. During the filling operation and when the pen is not in use, particularly if the air-inlet is open, the disk 15 should be rotated by turning tube 7 so that the perforations in said disk are closed by the squared portion of the end of tube 6. By this means, also, the amount of ink fed to the pen can be regulated, more or less of the perforations of the disk being covered and closed as trial demonstrates to be necessary. The ink fed through the disk is absorbed by the fibrous or porous matter immediately beneath and is conducted by the capillary passages in the brush to the pen proper suitably held on the short tube in one case or in the tubular device 23 in case the use of common pens is preferred. By removing the pen and the device 23, if that be employed, the brush is left free for separate use, and for this purpose it projects below the end of tube 18 a suitable distance.

The details of the above-described device may be varied by mechanical skill without departing from the invention, provided the substantial principles of construction and operation are preserved. Thus in some cases tube 18 may be made continuous with tube 7 and a part thereof.

I am aware that a brush has been used in a dipping-pen having no fountain and also in fountain-pens without provision to prevent ink escaping outside the brush when the pen was removed.

It is characteristic of my improvement that the brush is supplied with ink in restricted or regulated quantity whether the pen be in use or be removed.

Having thus described my invention, what I claim is—

1. The combination, in a fountain-penholder, of the ink well or tube 1, the tube 6, having an eccentric bore communicating with the interior of said tube 1, the tube 7, rotatable in a constant plane about tube 6, and a perforated disk fixed to and rotatable with tube 7, whereby the bore of tube 6 and the perforations in the disk can be made to register without moving said disk lengthwise of the pen and without compressing the same, substantially as set forth.

2. In a fountain-penholder, the combination of an ink-well, the tube 7, filled with the brush, the tube 18, fitting said tube 7, the pen adapted to be held on tube 18, and devices for regulating the flow of ink to the brush, substantially as set forth, whereby ink is automatically supplied to the brush whether the pen be in place or be removed.

3. In a fountain-pen, the combination of an ink-well, the tube 7, filled with the brush, the tube 18, fitting said tube 7, the removable pen and ink-guide, and devices for regulating the flow of ink to the brush, substantially as set forth, whereby ink is automatically supplied to the brush whether the pen be in place or be removed.

4. In a fountain-penholder, the combination of the ink-well, the tube 7, the removable perforated disk 15, the removable brush, and brush-tube 18, substantially as set forth.

5. In a fountain-penholder, the combination of the ink-well, the detachable tube 7, the removable perforated disk 15, the removable brush, brush-tube 18, and a pen, substantially as set forth.

6. In a fountain-penholder, the combination of the ink-well, the detachable tube 7, the removable perforated disk 15, the removable brush, the brush-tube 18, a pen, and devices 23, consisting of a tubular part and an ink-guiding needle, substantially as set forth.

7. In a fountain-penholder, the combination of the ink-well, the tubes 6 and 7, connected to said well and having a recess between them, the bearings 10, fixed to one of said tubes in the recess, the projections 12, fixed on the other, the elastic packings, plates interposed between said bearings and projections, an eccentric ink-passage in tube 6, and a perforated disk bearing against the foot of said latter tube, substantially as set forth.

In testimony whereof I have signed this specification in the presence of two subscribing witnesses.

ALBA H. ROBINSON.

Witnesses:
S. H. JOHNSON,
J. F. POLLOCK.